United States Patent [19]

Lea et al.

[11] Patent Number: 4,959,294

[45] Date of Patent: Sep. 25, 1990

[54] INFRA-RED SENSITISING DYES FOR SILVER HALIDE

[75] Inventors: Bernard A. Lea; Ronald W. Burrows; Thomas D. G. Hellings, all of Harlow, England; Charles G. Barlow; Ivan H. Skoog, both of St. Paul, Minn.

[73] Assignee: Minnesota Mining and Manufacturing Company, St. Paul, Minn.

[21] Appl. No.: 181,545

[22] Filed: Apr. 14, 1988

[51] Int. Cl.$^5$ .............................................. G03C 1/20
[52] U.S. Cl. ................................... 430/204; 430/230; 430/302; 430/584; 430/944; 430/945; 548/219
[58] Field of Search ............... 430/585, 572, 573, 576, 430/584, 602, 944, 270, 271, 945, 302, 204, 230; 548/219

[56] References Cited

U.S. PATENT DOCUMENTS

| | | | |
|---|---|---|---|
| 3,482,978 | 12/1969 | Fumia et al. | 96/84 |
| 4,011,083 | 3/1977 | Durning et al. | 96/109 |
| 4,263,397 | 4/1981 | Horikoshi et al. | 430/542 |
| 4,361,635 | 11/1982 | Kinderman et al. | 430/14 |
| 4,515,888 | 5/1985 | Beretta et al. | 430/594 |
| 4,536,473 | 8/1985 | Mihara | 430/575 |
| 4,618,570 | 10/1986 | Kadowaki et al. | 430/584 |
| 4,670,377 | 6/1987 | Miyoshi et al. | 430/621 |
| 4,690,883 | 9/1987 | Kubodera et al. | 430/584 |
| 4,784,933 | 11/1988 | Kanada et al. | 430/204 |
| 4,791,053 | 12/1988 | Ogawa | 430/581 |

OTHER PUBLICATIONS

Slominskii et al "Polymethine Dyes with Hydrocarbon Bridges," Journal of Organic Chemistry of the USSR, vol. 14, No. 10, pp. 2046-2051.
Slominskii, Yu L., et al. "Polymethine Dyes with Hydrocarbon Bridges, Enamino Ketones in the Chemistry of Dyanine Dyes," Zhurnal Organicheskoi Khimii, vol. 19, No. 10, pp. 2134-2142, Oct. 1983.
Reynolds, G. A. et al., "Stable Heptamethin Pyrylium Dyes That Absorb in the Infrared," J. Org. Chem., vol. 42, No. 5, 1977, pp. 885-888.

Primary Examiner—Paul R. Michl
Assistant Examiner—Mark R. Buscher
Attorney, Agent, or Firm—Donald M. Sell; Walter N. Kirn; Mark A. Litman

[57] ABSTRACT

Infra-red sensitizing dyes for silver halide having a nucleus of the general formula:

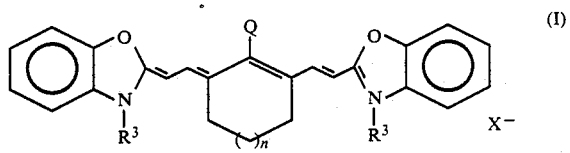

in which:
 Q represents Cl or Br,
 $R^3$ represents an alkyl or substituted alkyl,
 n is 0, 1, 2 or 3,
 X is an anion of molecular weight up to 400 which may be incorporated in one $R^3$ group.

10 Claims, No Drawings

INFRA-RED SENSITISING DYES FOR SILVER HALIDE

FIELD OF INVENTION

This invention relates to sensitising dyes for silver halide photographic emulsions and in particular to certain benzoxazole heptamethin cyanine dyes capable of sensitising silver halide emulsions to infra-red radiation.

BACKGROUND OF THE INVENTION

The current interest in producing hard copies from electronically stored information by using electronic output to modulate exposure sources such as lasers, laser diodes and light emitting diodes (L.E.D.) has created a demand for infra-red sensitive recording materials. It has been known for many years that silver halide emulsions can be spectrally sensitised to the infrared by use of spectral sensitising dyes. There are numerous references to dye structures for sensitising dyes which are stated to include infra-red within their sensitising range. Examples of patent disclosing such dyes are listed in U.S. Pat. No. 4011083. Infra-red sensitising dyes are generally cyanines derived from quinoline-2, quinoline-4, naphthothiazole, benzothiazole or benzoselenazole.

A group of benzoxazole dyes has now been found to possess particularly favourable spectral sensitization properties in the infra-red.

SUMMARY OF THE INVENTION

According to the present invention there is provided a photographic silver halide emulsion sensitive to infrared radiation comprising from 0.5 to 500 mg per mole of silver halide of a dye having a nucleus comprising:

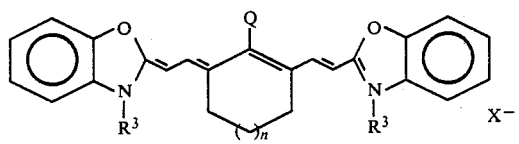

in which:

Q represents Cl or Br, preferably Cl, $R^3$ represents an alkyl or substituted alkyl, exemplary groups include alkyl groups containing from 1 to 5 carbon atoms, optionally substituted with Br or phenyl; sulphoalkyl, carboxyalkyl or hydroxyalkyl groups, containing up to 5 carbon atoms, n is 0, 1, 2 or 3, preferably 0 or 1, X is an anion of molecular weight up to 400 which may be incorporated in one $R^3$ group.

Specific classes of nuclei include:

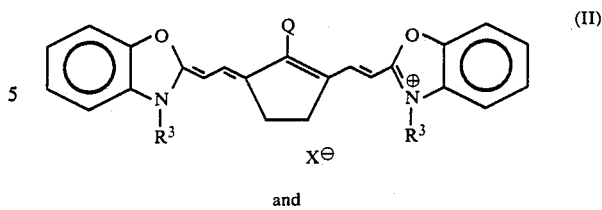

and

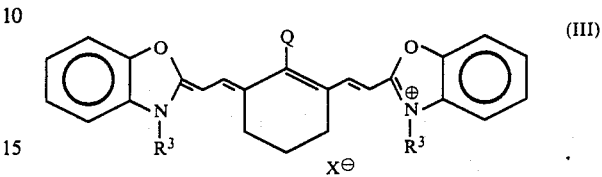

The central nucleus of the dye may possess a wide range of substituents of the type known in cyanine dye chemistry. Typical dyes will be of the general formula:

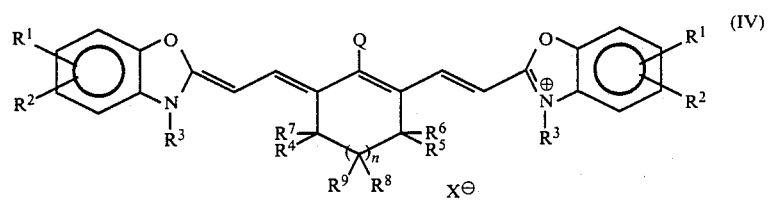

in which:

n, Q and $R^3$ are as defined above, $R^1$ and $R^2$ represent hydrogen or substituents of the type present in cyanine dyes, such as lower alkyl groups of 1 to 5 carbon atoms e.g. methyl, ethyl, halogen e.g. chlorine, bromine, lower alkenyl groups of 2 to 5 carbon atoms, lower alkoxy groups of 1 to 5 carbon atoms, e.g. methoxy, ethoxy, aryl groups e.g. phenyl, alkaryl or aralkyl groups, alkylamino, alkylthio, carboalkoxy groups containing up to 5 carbon atoms, $-NO_2$, $-NH_2$, $-NHCOCH_3$, or $(CH_2)_mCOOH$ where m is 1 to 5, or $R^1$ and $R^2$ together on adjacent carbons may represent the necessary atoms to complete a fused carbocyclic or heterocyclic ring which may possess ring substituents, $R^4$ to $R^9$ independently represent hydrogen or a lower alkyl group of 1 to 5 carbon atoms or any two of these substituents on adjacent carbon atoms may together represent the necessary atoms to complete a fused benzene ring if n=0, and $X^\ominus$ represents an anion e.g. halide, $C_7H_7SO_3^\ominus$, alkylsulphate or $X^\ominus$ may be combined with one $R^3$ group e.g. $R^3X^\ominus$ may represent $(CH_2)_3SO_3^\ominus$, $(CH_2)_2COO^\ominus$ etc.

DETAILED DESCRIPTION OF THE INVENTION

The dyes of the invention spectrally sensitise silver halide emulsions to radiation in the infra-red from 700 nm upwards, especially from 760 to 860 nm, to provide photographic materials which are particularly suitable for use with a number of commercially available laser diodes and light emitting diodes emitting in this region. In addition to providing sensitization to the desired wavelength range the sensitising dyes of the invention provide unexpected and beneficially large increases in the speed of the photographic media compared to the use of known dyes sensitising to this wavelength region.

A further important advantage of the dyes of the invention is that the sensitised emulsions exhibit a high infrared to green speed ratio enabling the less green sensitive material to be made whilst maintaining adequate infrared speed. In turn this permits the use of brighter safelights.

The dyes have found particular utility in photographic media incorporated in printing plates of the type disclosed in U.S. Pat. No. 4361635. Such plates are intended to be exposed to the emission of laser diodes.

The long wavelength sensitization provided by the dyes of the invention is particularly unexpected. Cyanine dyes for spectral sensitization a the longer wavelengths are generally derived from benzothiazole or quinoline nuclei whilst benzoxazole structures show their principal utility in green sensitising cyanine dyes. It is believed that the hypsochromic effect of using a benzoxazole rather than a benzothiazole is offset by a strongly bathochromic effect of the meso-halo eg. mesobromo or meso-chloro substituents.

The dyes of formula (IV) are novel with the exception of the following:

(i) n=0, Q=Cl, $R^4$ to $R^7$=H, $R^3$=$C_2H_5$, $R^1$=H, $R^2$=5—$C_6H_5$, (ii) n=1, Q=Cl, $R^4$ to $R^9$=H, $R^3$=$C_2H_5$, $R^1$=H, $R^2$=5—$C_6H_5$, (iii) n=1, Q=Cl, $R^4$ to $R^9$=H, $R^3$=$C_2H_5$, $R^1$ and $R^2$ complete a fused benzene ring which are disclosed in Y. Slominskii, I. Radchenko and A. Tolmachev, J. Org. Chem (Russ) 14 (10) 2046–51 (1978). There is no disclosure of the use of these dyes in photographic emulsions.

According to a further aspect of the invention there is provided dyes of the general formula (IV) with the proviso that when Q is Cl and $R^4$ to $R^9$ are hydrogen, $R^1$ to $R^3$ do not complete a 3-ethyl-5-phenyl-2-benzoxazolium or 3-ethyl-2-naphtho[1,2-d] oxazolium nucleus.

Dyes used in the invention may be prepared according to the following reaction scheme (A):

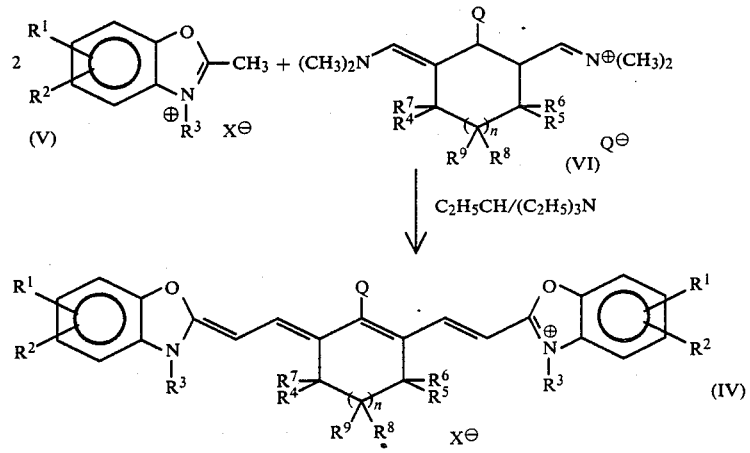

Compounds of formula (VI) may be prepared by the following reaction scheme (B):

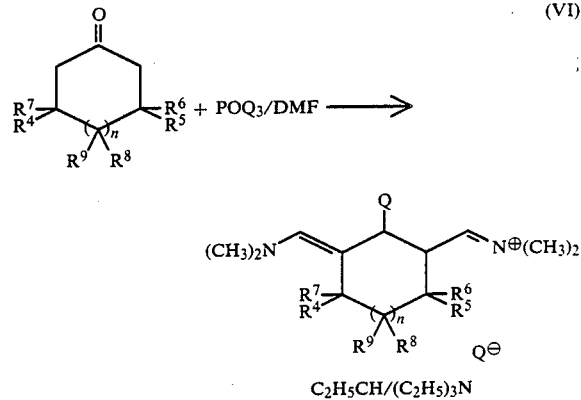

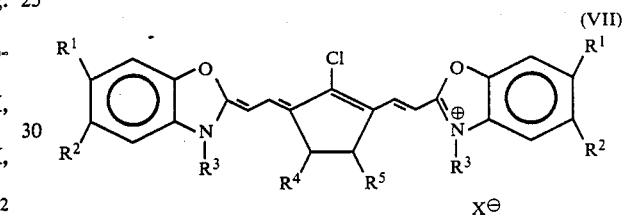

The cyclic ketone may be cyclopentanone, cyclohexanone cycloheptanone or cyclo-octanone. DMF=N,N-dimethylformamide.

Reaction conditions are disclosed in CA 56 114571 and J. Org. Chem Vol 42 (1977) page 885.

Preferred dyes of the invention are of the formula:

(VII)

in which:

$R^1$ to $R^5$ and X are as defined above.

Dyes of the formula (VII) which have been prepared by reaction scheme (A) are reported in the following Table.

| Dye | $R^1$ | $R^2$ | $R^3$ | $R^4$ | $R^5$ | λ max (MeOH) nm |
|---|---|---|---|---|---|---|
| A | H | H | $C_2H_5$ | H | H | 739 |
| B | $CH_3$ | $CH_3$ | $C_2H_5$ | H | H | 752 |
| C | H | $C_6H_5$ | $C_2H_5$ | H | H | 752 |
| D | $CH_3O$ | H | $C_2H_5$ | H | H | 756 |

Dyes of formula (IV) in which $R^6$, $R^7$ and $R^8$ are hydrogen have been prepared and are reported in the following Table.

| DYE | $R^1$ | $R^2$ | $R^3$ | $R^4$ | $R^5$ | $R^9$ | $X^-$ | Q | n | λmax (MeoH) nm |
|---|---|---|---|---|---|---|---|---|---|---|
| E | 5-CH$_3$ | 6-CH$_3$ | C$_2$H$_5$ | H | H | H | I | Cl | 1 | 728 |
| F | H | 5-CH$_3$ | C$_2$H$_5$ | H | H | H | I | Cl | 1 | 722 |
| G | H | 5-OCH$_3$ | C$_2$H$_5$ | H | H | H | I | Cl | 1 | 735 |
| H | 5-CH$_3$ | 6-CH$_3$ | CH$_3$ | H | H | H | I | Cl | 1 | 728 |
| I | 5-CH$_3$ | 6-CH$_3$ | C$_2$H$_5$ | H | H | — | I | Br | 0 | 754 |
| J | H | 5-OCH$_3$ | C$_2$H$_5$ | H | H | — | I | Br | 0 | 758 |
| K | 6:7-Benzo | | C$_2$H$_5$ | H | H | H | I | Cl | 1 | 746 |
| L | 5-CH$_3$ | 6-CH$_3$ | C$_2$H$_5$ | H | H | H | I | Br | 1 | 730 |
| M | H | 5-CH$_3$ | C$_2$H$_5$ | H | H | — | I | Cl | 0 | 742 |
| N | H | 5-C$_2$H$_5$ | C$_2$H$_5$ | H | H | — | I | Cl | 0 | 742 |
| O | H | 6-CH$_3$ | C$_2$H$_5$ | H | H | — | I | Cl | 0 | 747 |
| P | 5-CH$_3$ | 7-CH$_3$ | C$_2$H$_5$ | H | H | — | I | Cl | 0 | 746 |
| Q | 5-CH$_3$ | 6-CH$_3$ | C$_2$H$_5$ | H | H | C$_2$H$_5$ | I | Cl | 1 | 728 |
| R | 5-CH$_3$ | 6-CH$_3$ | C$_2$H$_5$ | H | H | H | Br | Cl | 1 | 730 |
| S | 5-CH$_3$ | 6-CH$_3$ | C$_2$H$_5$ | H | CH$_3$ | H | I | Cl | 1 | 727 |
| T | 5-CH$_3$ | 6-CH$_3$ | C$_2$H$_5$ | H | CH$_3$ | — | I | Cl | 0 | 749 |
| U | 5-CH$_3$ | 6-CH$_3$ | C$_2$H$_5$ | H | H | — | C$_7$H$_7$SO$_3$ | Cl | 0 | — |
| V | 5-CH$_3$ | 6-CH$_3$ | C$_2$H$_5$ | H | H | — | Br | Cl | 0 | 752 |
| W | 5-CH$_3$ | 6-CH$_3$ | C$_2$H$_5$ | H | H | — | CH$_3$SO$_4$ | Cl | 0 | 752 |

Wavelengths of maximum silver halide sensitization are typically 50 nm greater than the solution maxima.

It is preferred that silver halide grains used for the silver halide emulsion layer in this invention be of substantially surface latent image type.

The silver halide emulsion used in the invention may comprise any of silver chloride, silver chlorobromide, silver iodobromide, silver iodochlorobromide, etc. The silver iodide content is preferably not more than 10 mol%, and more desirably is in the range of from 0.1 to 5 mol%.

In regard to the average grain size of silver halide used in accordance with this invention, fine grains (for example, 1.0 micron or less) are preferable, and very fine grains not larger than 0.5 micron are particularly preferably. While the grain size distribution is optional, a monodispersion is preferable for printing plate and graphic arts applications. The term "monodispersion" as used herein means that, whether in weight or in number, at least 95% of grains are sized within ±40% of the mean grain size.

The silver halide grains in the photographic emulsion may be of regular crystals of cubic, orthorhombic, tabular, octahedral or tetrahedral habit, or irregular crystals such as spherical or composites.

Each of the silver halide grains may be made up of a uniform phase through its core and surface layer, or may be dissimilar in phase between the core and the surface. It is also possible to use two or more independently prepared silver halide emulsions as a mixture.

In the course of formation of silver halide grains or in the process of physical ripening, there may be added to the silver halide emulsion a cadmium salt, lead salt, thallium salt, rhodium salt or rhodium complex salt, iridium salt or iridium complex salt, ruthenium salt or ruthenium complex salt or the like. Gelatin is preferably used as the binder or protective colloid for the photographic emulsion, but other hydrophilic colloids can also be employed.

For example, gelatin derivatives, graft copolymers of gelatin to other high polymers, proteins such as albumin and casein, cellulose derivatives such as hydroxyethyl cellulose, carboxymethyl cellulose, cellulose sulphate esters, etc., sugar derivatives such as sodium alginate, starch derivatives, etc., and synthetic homo- or copolymers such as polyvinyl alcohol, poly-N-vinylpyrrolidone, polyacrylic acid, polymethacrylic acid, polyacrylamide, polyvinylimidazole and polyvinylpyrazole.

The silver halide emulsion may be chemically sensitized. Known methods for chemical sensitization of silver halide emulsions include sulphur sensitization, reduction sensitization and noble metal sensitization, and the chemical sensitization may be effected by any or a combination of such methods.

The usual method of the noble metal sensitization is gold sensitization and for this purpose, a gold compound generally a complex salt of gold, is utlized. Complex salts of other noble metal such as platinum, palladium, rhodium, etc., may be additionally contained. Examples of this method are described in U.S. Pat. No. 2448060 and British Patent 618061.

Sulphur sensitizers include, in addition to sulphur compounds contained in gelatin, various sulphur compounds such as thiosulphates, thiourea compounds, thiazoles, and rhodanines.

Reduction sensitizers include stannous salts, amines, formamidinesulphinic acid, silane compounds and the like.

Supersensitisers may also be employed.

The photographic emulsions may be high contrast e.g. lith films, containing a hydrazine or other additives known in the art. Such materials are disclosed, for example, in U.S. Pat. Nos. 2322027, 2419974, 2419975, 4166742, 4168977, 4211857, 4224401, 4743739, 4272606, 4272614, 4311781 and 4323643.

The photographic elements may include a variety of compounds for the prevention of fog during production storage or photographic processing or for the purpose of stabilising the photographic qualities. Thus, for example, there may be added the compounds referred to commonly as antifoggants or stabilizers, for example, various azole compounds (such as benzothiazolium salts, nitroimidazoles, chlorobenzimidazoles, bromobenzimidazoles, mercaptothiazoles, mercaptobenzothiazoles, nitrobenzothiazoles, etc.), mercaptopyrimidines, thioketo compounds (such as oxazolinethione, etc.), azaindenes (such as triazaindene), tetraazaindenes (particularly, 4-hydroxy-substituted-(1,3,3a,7)tetraazaindenes), pentaazaindenes, etc.), benzenethiosulphonic acid, benzenesulphinic acid, benzenesulphonamide, etc.

Amongst these compounds, benzotriazoles (e.g., 5-methylbenzotriazole) and nitroindazoles (e.g., 5-nitroindazole) are preferred. These compounds may also be incorporated in the processing solution.

The photographic elements may contain inorganic or organic hardening agents in the photographic emulsion layer or other hydrophilic colloid layer. For this purpose chromium salts (chrome alum, chromium acetate, etc.), aldehydes (formaldehyde, glyoxal, glutaraldehyde, etc.), N-methylol compounds (dimethylolurea, methyloldimethylhydantoin, etc.), dioxane derivatives (2,3,-dihydroxydioxane, etc.), active vinyl compounds (1,3,5 triacryloyl-hexahydro-s-trazines, 1,3,-vinyl-sulphonyl-2-propanol, etc.), active halogen compounds (2,4,-dichloro-6-hydroxy-s-triazine, etc.), mucohalogenic acids (mucochloric acid, mucophenoxy-chloric acid, etc.), and the like. These hardening agents may be incorporated alone or in combination.

In the photographic emulsion layer or other hydrophilic colloid layer in the photographic material produced in accordance with this invention, a variety of surface active agents may be incorporated for various purposes, such as improvement of coating properties, antistatic properties, slipping properties, emulsion dispersibility, anti-adhesion properties, and photographic properties (for example, development acceleration, increase in contrast, sensitization, etc.).

Nonionic surfactants may be employed such as saponin (steroidal), alkylene oxide derivatives e.g. polyethylene glycol, polyethylene glycol/polypropylene glycol condensate, polyethylene glycol alkyl ethers, polyethylene glycol alkyl aryl ethers, polyethylene glycol esters, polyethylene glycol sorbitan esters, polyalkylene glycol alkylamines or amides, silicone polyethylene oxide adducts), glycidol derivatives (e.g., alkenylsuccinic acid polyglyceride, alkylphenol polyglyceride), polyhydric alcohol-fatty acid esters, sugar alkyl esters, etc. Anionic surfactants containing acid groups such as a carboxyl groups, a sulpho group, a phospho group, a sulphuric acid ester group, a phosphoric acid ester group, etc., for example alkylcarboxylate, alkylsulphonates, alkylbenzenesulphonates, alkylnaphthalenesulphonates, alkylsulphuric acid esters, alkylphosphoric acid esters, n-acyl-n-alkyltaurines, sulphosuccinic acid esters, sulphoalkylpolyoxyethylene alkylphenyl ether, polyoxyethylene alkylphosphoric acid esters, etc., may be used. Amphoteric surfactants such as amino acids, aminoalkylsulphonic acids, aminoalkylsulphuric or phosphoric acid esters, alkylbetaines, amine oxides etc.; and cationic surfactant such as alkylamines, aliphatic or aromatic quaternary ammonium salts, heterocyclic quaternary ammonium salts such as pyridinium salts, heterocyclic quaternary ammonium salts such a pyridinium salts, imidazolium salts, etc., aliphatic or heterocyclic ring-containing phosphonium or sulphonium salts, etc. may be used.

In the photographic emulsion layer or the hydrophilic colloid layer of the photographic material according to this invention, matting agents such as silica, magnesium oxide, polymethyl nethacrylate, etc., may be incorporated for the purpose of preventing adhesion.

The support of the photographic element may be made of cellulose triacetate, cellulose diacetate, nitrocellulose, polystyrene, polyester, polyethylene terephthalate or the like.

Suitable developer compositions for use in the invention are any of those known in the art.

There is no particular limitation of the developing agents that can be employed in the method of this invention. Thus, for example, dihydroxybenzenes (e.g., hydroquinone), 3-pyrazolidones (e.g., 1-phenyl-3-pyrazolidone, 4,4-dimethyl-1-phenyl-3-pyrazolidone), aminophenols (e.g. 4-methylaminophenol), etc., can be used alone or in combination.

The present invention finds particular utility in photolithographic elements suitable for preparation of lithographic printing plates. A preferred photolithographic element comprises a silver salt diffusion transfer system.

In the silver salt diffusion process, an imagewise exposed silver halide emulsion layer is positioned in intimate contact with a receptor element and developed in the presence of a silver halide solvent such that the unexposed silver halide diffuses into the receptor element where it is developed to provide an image. Development nuclei or catalyst, contained in the receptor element, cause the diffusion silver halide to be reduced to metallic silver, thereby forming an image on the receptor element surface.

More specifically in the silver halide diffusion transfer process a developer composition is used which contains a developing agent, e.g., hydroquinone, a solubilizing agent for silver halide, e.g., thiosulphate ion and, preferably an antifoggant, e.g., benzotriazole. When an imagewise exposed plate is contacted with the developer composition, the light exposed silver halide grains are reduced to silver metal in normal fashion. The unexposed grains dissolve in the developer via formation of soluble silver complexes, such as the complexes of silver thiosulphate. When the soluble silver complex contacts a development nuclei or catalyst, typically contained in a receptor layer or element, the silver is reduced to a metallic deposit. This deposit can then form the ink receptive image areas of a lithographic plate.

Preferred photolithographic materials are described in U.S. Pat. No. 4361635 which discloses a photolithographic light-sensitive sheet capable or providing a lithographic plate after imaging by diffusion transfer comprising a support, a silver halide emulsion layer overlying said support, and a receptor layer overlying said emulsion, said receptor layer containing catalytic nuclei for silver salt diffusion transfer development. Preferably the receptor layer comprises at least one high molecular weight hydrophilic polymer the major proportion of said polymer being a dialdehyde polysaccharide.

The invention will now be illustrated by the following Examples.

EXAMPLE 1

Synthesis of Dye A (a) 3 ethyl-2-methyl-benzoxazolium iodide was prepared by heating 2-methyl-benzoxazole with iodoethane under reflux.

(b) N[[2-chloro-3-[(dimethylamino)methylene]-1-cyclopenten-1-yl]methylene]-N-methyl-methanaminium chloride was prepared according to the procedures disclosed in CA56 114571 and J. Org. Chem 42 (1977) page 885.

A mixture of dimethylformamide (DMF) (40 ml) and dichloromethane (40 ml) was stirred and maintained below 10° C. by means of external cooling whilst a solution of phosphoryl chloride (37 ml) in dichloromethane (40 ml) was added slowly.

A solution of cyclopentanone (9.6 g) in dichloromethane (10 ml) was next added rapidly and the whole then stirred and heated under reflux on a steam bath for 4 hours.

The resultant mixture was then allowed to cool before the addition of dry ether (2 liter). After standing overnight the ether was decanted from the sticky precipitate and discarded. Treatment of the sticky residue with more dry ether was followed by the additions of ethyl acetate (100–200 ml) after decanting the ether.

The product became crystalline and was filtered off, dried and stored in the desiccator over KOH pellets, a yield of 20–40 g being obtained. A methanol solution shows the wavelengths of maximum absorbance at 474 nm.

(c) Synthesis of Dye A

N[[2-chloro-3-[(dimethylamino)methylene]-1-cyclopenten-1-yl]methylene]-N-methyl-methanaminium chloride (12.4 g, 0.05M and 3-ethyl-2-methylbenzoxazolium iodide (28.9 g 0.1M), both prepared as described above, were suspended together in ethanol (400 ml). The mixture was heated to the boil and triethylamine (42 ml, 0.15M) was added, followed by heating under reflux for 5 minutes. After allowing to cool to about 50° C. a dark coloured mixture was filtered and the residue of glistening green crystals was washed with ethanol in which it is only slightly soluble.

The yield of 4.0 g was recrystallised from methanol (3 liters) to give 3.0 g of Dye A.

The wavelength of maximum absorbance in methanol was 739 nm with extinction coefficient of $2.8 \times 10^5$ mole$^{-1}$ cm$^{-1}$.

EXAMPLE 2

Synthesis of Dye E

Dimethylformamide (122 ml, 1.5 moles) was cooled to −5° C. in a flask protected against moisture. The phosphorus oxychloride (71 ml, 0.76 mole) was slowly added with stirring while maintaining the temperature to less than 2° C. The mixture was stirred at 5° C., for 2 hours after the addition. The 26 ml (0.25 mole) of cyclohexanone was slowly added with good stirring. The mild exotherm was allowed to raise the temperature to 45° C., where the mixture was stirred for 30 minutes. After cooling, the red oil was washed 3 times with ether by stirring and decanting. The remaining ether was removed under reduced pressure at 35° to 40° C. to give 245 g, of a stiff red oil.

The dye was prepared by dissolving 4.0 g (0.125 mole) of 3-ethyl-2,5,6-trimethylbenzoxazolium iodide in 15 ml, methanol with 11 ml, triethylamine, and slowly adding 4.9 g, of the red oil Vilsmeier complex prepared above. The exotherm carried the mixture to reflux and the mixture was allowed to cool after the addition. The precipitate was collected and washed several times with methanol. The green solid was boiled with 5 ml of methanol and collected to give 1.21 g of Dye E (30% yield) melting point 256°–257° C. The absorption maximum in methanol was at 728 nm.

EXAMPLE 3

Sensitization of chlorobromide emulsion

The sensitising efficiency of dyes was evaluated with a rhodium doped 70/30 silver chlorobromide emulsion of 0.4 micron mean grain size distribution prepared by a conventional double jet procedure. The emulsion was sulphur and gold sensitised and stabilised with a tetraazaindene. To 0.15 mole of this emulsion at 45° C. was added varying quantities of 0.05% sensitising dye solution in a methanol/DMF mixture followed by addition of a 0.5% aqueous solution of Leucophor BCF supersensitiser (available from Sandoz). After holding for 30 minutes at 45° C., 4.5 ml or 2% Triton X-200 surfactant (available from Rohm and Haas), and 7.5 ml of 2% formaldehyde solution were added. The pH of the emulsion was adjusted to 5.5 and the weight made up to 195 g with water. The emulsion was double-slot coated onto 4 mil (100 micron) clear polyester base together with a protective top coat of gelatin solution containing dispersed silica to give a silver coverage of 3.5 g per square meter.

The coated material was exposed via a xenon flash exposure (1 millisec through an interference filter with peak transmission at 800 nm and a half bnad width of 30 nm together with a 0–4 continuous wedge.

The exposed material was developed for 20 seconds at 35° C. in 3M Company RDC developed in a graphic arts rapid processor.

The relative log speeds were recorded at a speed point of 0.2 above minimum density and are reported in the following Table as a comparison against Control 1 which is a well-known cyanine dye of the formula:

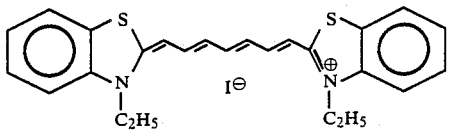

| DYE | Volume of Dye[1] | SPEED Rel. LogE |
|---|---|---|
| Control 1 | 10 | 0.0 |
| A | 10 | +0.33 |
| B | 20 | +0.59 |
| C | 20 | +0.15 |
| D | 20 | +0.15 |

[1] ml of 0.05% solution added per mole of silver halide

It will be seen that the dyes of the invention provide a substantial increase in speed compared to a well known dye (Control 1) of similar spectral absorbance.

A further advantage of the dyes of the invention is that they give very sharp sensitisation resulting in a high infrared to green sensitivity ratio. This makes the use of brighter safelights possible.

EXAMPLE 4

A silver chlorobromide emulsion (Cl 64%, Br 36%) of 0.24 micron grain size and a narrow grain size distribution was prepared by a conventional double jet procedure. The emulsion was desalted and sensitised with gold and sulphur following conventional procedures.

The emulsion was divided into portions to which were added sensitising dyes of the invention as indicated in the Table (15 mg dye per mole of silver) followed by addition of Leucophor BCF as a supersensitiser (2.5 cm$^3$ of 2% aqueous solution per mole of silver). For comparison a good infrared sensitising dye (Control 2) known to the prior art was tested under the same conditions.

The emulsion samples were coated on polyester film base and exposed using a xenon flash sensitometer through a series of narrow band filters from 760 to 820 nm. The exposed samples were developed in a 90 second X-ray processor. The sensitometric results are recorded in the following Table. The wavelength of the exposure reported in the Table correspond to the sensitivity maxima of the dyes of the invention.

| Dye | Exposure wavelength | Relative Log Sensitivity at Density = 1.0 |
|---|---|---|
| Control 2 | 780 | 1.87 |
| Control 2 | 800 | 2.03 |
| Control 2 | 820 | 2.09 |
| E | 780 | 2.63 |
| F | 780 | 2.40 |
| K | 790 | 2.53 |
| M | 800 | 2.21 |
| O | 780 | 2.25 |
| P | 800 | 2.29 |
| Q | 780 | 2.15 |
| S | 780 | 2.54 |
| T | 800 | 2.55 |

It can be seen from the Table that the dyes of the invention provide significantly higher sensitivity in the near infrared region of the spectrum compared with the prior art dye.

EXAMPLE 5

Photolithographic element

A lithographic plate construction of the type disclosed in U.S. Pat. No. 4361635 was prepared as follows:

Anti-halation layer

A 4 mil (100 micron) thick polyester film, having a photographic subbing coating on one side to increase adhesion of the photographic layers to the base, was coated with a conventional anti-halation layer, consisting of gelatin, silica of 5 micron average grain diameter, carbon black, an anionic surface active agent, hydroquinone and formaldehyde, as hardener. This composition was coated at a wet coating weight of about 40 milligrams per square meter.

Photographic Emulsion layer

A conventional negative-active cubic, monodispersed silver chlorobromide photographic emulsion containing 75 molar percent silver chloride and 25 molar percent silver bromide with an average grain size of 0.35 microns was prepared by double jetting the silver and halide solutions under controlled pAg. The emulsion was digested with a sulphur sensitiser and sodiu tetrachloro-aurate. The silver halide crystals were homogeneously doped with $(RhCl_6)^{3-}$ at a concentration of $3.2 \times 10^{-7}$ mole per mole of AgX.

After the addition of both 0.5 g Leucophor BCF/mole AgX and the quantity of dyes reported in the following Table, the optimally digested emulsion at pH 5.0 was held at 50° C. for 15 minutes.

A stabilizer, 4-hydroxy-6-methyl-(1,3,3a,7)-tetraazaindene, was added to the dye emulsions which were then chilled until coating.

The emulsions were coated onto the base containing the antihalation layer at 6 mg/dm².

Receptor layer

A receptor layer comprising colloidal palladium, Triton X-100 and dialdehyde starch was coated over the photographic emulsion layers to give a palladium metal coating weight of about 1.4 milligrams per square meter.

Sensitometric Testing

Sensitometric testing was by exposure to radiation through narrow pass filters at 780 nm and 820 nm respectively, followed by development for 30 seconds in a diffusion transfer, hydroquinone and Phenidone containing developer.

Speeds were measured by reflection densitometry and are reported in the following Table in relative log E values.

| SAMPLE | VOLUME OF SENSITISING DYE[1] | | SPEED AT 780 nm | SPEED AT 820 nm |
|---|---|---|---|---|
| | CONTROL 2 | DYE A | | |
| 1 | 30 | | .68 | .64 |
| 2 | 60 | | 1.14 | 1.12 |
| 3 | 90 | | 1.28 | 1.27 |
| 4 | 120 | | 1.32 | 1.28 |
| 5 | 150 | | 1.06 | .90 |
| 6 | | 30 | 1.40 | .89 |
| 7 | | 60 | 2.02 | 1.49 |
| 8 | | 90 | 2.20 | 1.72 |
| 9 | | 120 | 2.15 | 1.50 |
| 10 | | 150 | 2.16 | 1.41 |

[1]milliliters of 0.05% solution in methanol per mole of silver halide.

Control 2 was a dye of the formula:

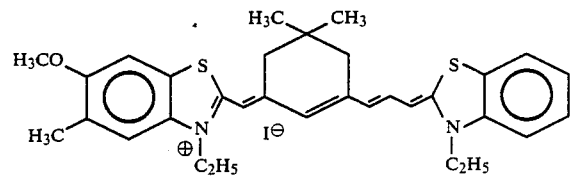

It will be seen from the above Table that the optimal speeds of 780 nm between the dye of the invention and Control 2, which is a known dye of similar absorbance, differ by 0.88 log E.

This is highly advantageous result showing a large speed increase at a wavelength corresponding to the emission of commercially available laser-diode scanning exposure devices e.g. the Ultrasetter device commercially available from Ultra Corporation U.S.A.

We claim:

1. A photographic silver halide emulsion sensitive to infrared radiation characterised in that it comprises from 0.5 to 500 mg per mole of silver halide of a dye having a nucleus comprising:

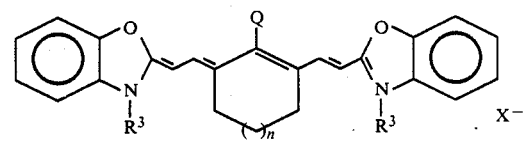

in which:
Q represents Cl or Br,
$R^3$ represents an alkyl or substituted alkyl group,
n is 0, 1, 2 or 3,
X is an anion of molecular weight up to 400 which may be incorporated in one $R^3$ group.

2. An emulsion as claimed in claim 1 characterised in that the dye has one of the following nuclei:

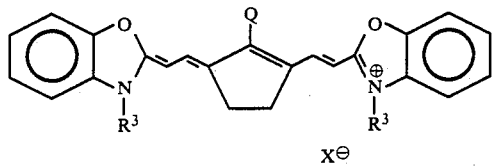 (II)

in which:

X and $R^3$ are as define in claim 1.

3. A photographic silver halide emulsion sensitive to infrared radiation characterised in that it comprises from 0.5 to 500 mg per mole of silver halide of a dye of the general formula:

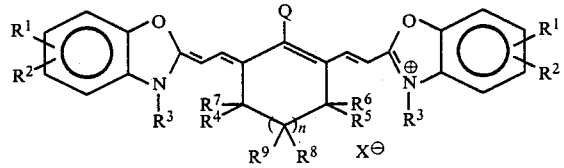 (IV)

in which:

Q represents Cl or Br, $R^3$ represents an alkyl or substituted alkyl group, n is 0, 1, 2 or 3, X is an anion of molecular weight up to 400 which may be incorporated in one $R^3$ group, each $R^1$ and $R^2$ independently represent hydrogen or a substituent of the type present in cyanine dyes, $R^4$ to $R^9$ each independently represent hydrogen or a lower alkyl group of 1 to 3 carbon atoms or any two of these substituents on adjacent carbon atoms may together represent the necessary atoms to complete a fused benzene ring, if n=0.

4. An emulsion as claimed in claim 3 characterised in that the dye has the general formula:

in which:

$R^1$ to $R^5$ and $X^-$ are as claimed in claim 3.

5. An emulsion as claimed in claim 3 characterised in that n is 0 or 1 and $R^1$ and $R^2$ are selected from hydrogen, lower alkyl groups of 1 to 5 carbon atoms, lower alkenyl groups of 2 to 5 carbon atoms, lower alkoxy groups of 1 to 5 carbon atoms, aryl groups, aralkyl groups, alkaryl groups, halogen, alkylamino, alkylthio, carboalkoxy, in which the alkyl chains contain up to 5 carbon atoms, $-NH_2$, $-NO_2$, $-NHCOCH_3$ and $-(CH_2)_mCOOH$ where m=1 to 5 or $R^1$ and $R^2$ together represent the necessary atoms to complete a fused ring which may possess ring substituents.

6. An emulsion as claimed in claim 3 characterised in that the dye is selected from:

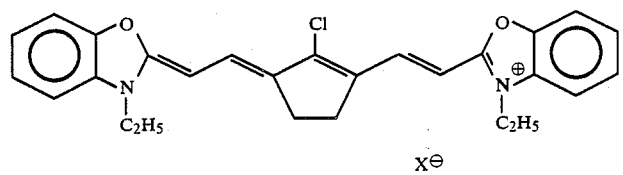

and

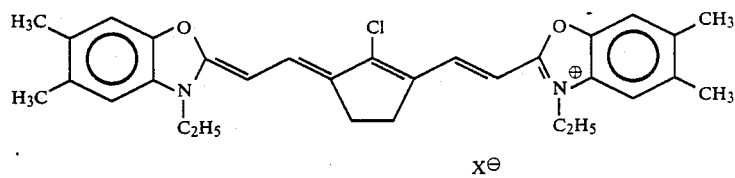

in which:

X is as defined in claim 3.

7. An emulsion as claimed in claim 2 characterised in that the compound is present in an amount in the range 5 to 250 mg per mole of silver halide.

8. A photographic element comprising a support bearing a photographic silver halide emulsion as claimed in claim 1.

9. An element as claimed in claim 8 in the form of a photolithographic sheet capable of forming a lithographic printing plate upon imaging via a silver salt diffusion transfer comprising a support, a silver halide emulsion layers and a receptor layer overlying the emulsion, the receptor layer containing catalytic nuclei for silver salt diffusion transfer development.

10. An element as claimed in claim 9 in the form of a photolithographic sheet capable of forming a lithographic printing plate upon imaging via a silver salt diffusion transfer comprising a support, a silver halide emulsion layer and a receptor layer overlying the emulsion, the receptor layer comprising a high molecular weight hydrophilic polymer and catalytic nuclei for silver salt diffusion transfer development, the major proportion of the polymer being a dialdehyde polysaccharide.

* * * * *

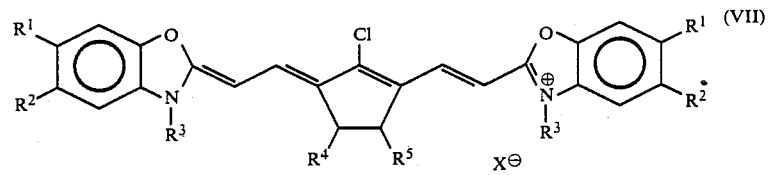 (VII)

UNITED STATES PATENT AND TRADEMARK OFFICE
CERTIFICATE OF CORRECTION

PATENT NO. : 4,959,294

DATED : September 25, 1990

INVENTOR(S) : Lea, Burrows, Hellings, Barlow and Skoog

It is certified that error appears in the above-identified patent and that said Letters Patent is hereby corrected as shown below:

Column 10, line 16, "bnad" should be --band--.

Column 11, line 52, "sodiu" should be --sodium--.

Signed and Sealed this

Twenty-first Day of January, 1992

Attest:

HARRY F. MANBECK, JR.

Attesting Officer

Commissioner of Patents and Trademarks